US007233845B2

(12) United States Patent
Veinotte

(10) Patent No.: US 7,233,845 B2
(45) Date of Patent: Jun. 19, 2007

(54) METHOD FOR DETERMINING VAPOR CANISTER LOADING USING TEMPERATURE

(75) Inventor: Andre Veinotte, Ontario (CA)

(73) Assignee: Siemens Canada Limited, Chatham (CA)

( * ) Notice: Subject to any disclaimer, the term of this patent is extended or adjusted under 35 U.S.C. 154(b) by 443 days.

(21) Appl. No.: 10/804,196

(22) Filed: Mar. 19, 2004

(65) Prior Publication Data

US 2004/0250796 A1 Dec. 16, 2004

Related U.S. Application Data

(60) Provisional application No. 60/456,418, filed on Mar. 21, 2003, provisional application No. 60/456,383, filed on Mar. 21, 2003.

(51) Int. Cl.
*G06F 7/00* (2006.01)
*F02M 33/02* (2006.01)

(52) U.S. Cl. ........................................ 701/29; 123/520

(58) Field of Classification Search .................. 701/29
See application file for complete search history.

(56) References Cited

U.S. PATENT DOCUMENTS

| | | | | |
|---|---|---|---|---|
| RE32,157 | E | 5/1986 | Waugh et al. | |
| 4,962,744 | A | 10/1990 | Uranishi et al. | 123/520 |
| 4,995,369 | A | 2/1991 | Cook | |
| 5,099,439 | A | 3/1992 | Saito | 364/551.01 |
| 5,113,834 | A * | 5/1992 | Aramaki | 123/520 |
| 5,143,035 | A | 9/1992 | Kayanuma | |
| 5,150,689 | A | 9/1992 | Yano et al. | 123/519 |
| 5,158,054 | A | 10/1992 | Otsuka | |
| 5,251,592 | A * | 10/1993 | Seki et al. | 123/198 D |
| 5,263,462 | A | 11/1993 | Reddy | |
| 5,275,144 | A | 1/1994 | Gross | |
| 5,295,472 | A | 3/1994 | Otsuka et al. | |
| 5,317,909 | A | 6/1994 | Yamada et al. | |
| 5,333,589 | A | 8/1994 | Otsuka | |
| 5,398,661 | A | 3/1995 | Denz et al. | |
| 5,451,927 | A | 9/1995 | Thompson | |
| 5,462,034 | A | 10/1995 | Kadota | |
| 5,490,414 | A | 2/1996 | Durschmidt et al. | |
| 5,635,630 | A | 6/1997 | Dawson et al. | |
| 5,699,775 | A | 12/1997 | Azuma | |
| 5,744,701 | A | 4/1998 | Peterson et al. | |
| 5,750,888 | A | 5/1998 | Matsumoto et al. | |
| 5,781,877 | A | 7/1998 | Rachel et al. | |

(Continued)

FOREIGN PATENT DOCUMENTS

| | | |
|---|---|---|
| EP | 0 598 176 | 5/1994 |

(Continued)

OTHER PUBLICATIONS

PCT International Search Report, Application No. PCT/CA2004/000419, date of completion Jul. 7, 2004.

(Continued)

*Primary Examiner*—Thu V. Nguyen

(57) ABSTRACT

A method of managing the saturation level of a vapor collection canister for an on-board fuel vapor emission control system. The method includes flowing the fuel vapor through a canister flow path between a first port and a second port of the vapor collection canister, and signaling with a sensor the temperature of an adsorbent disposed in the canister flow path, the sensor being exposed to the adsorbent.

16 Claims, 5 Drawing Sheets

U.S. PATENT DOCUMENTS

| | | | | |
|---|---|---|---|---|
| 5,803,055 | A | 9/1998 | Goto et al. | |
| 5,823,167 | A | 10/1998 | Fukuchi et al. | 723/421 |
| 5,868,120 | A | 2/1999 | Van Welten et al. | |
| 5,918,581 | A | 7/1999 | Uto et al. | |
| 5,957,115 | A | 9/1999 | Busato et al. | |
| 5,964,812 | A | 10/1999 | Schumacher et al. | |
| 5,967,124 | A | 10/1999 | Cook et al. | |
| 5,988,206 | A | 11/1999 | Bare et al. | |
| 6,073,487 | A | 6/2000 | Dawson | |
| 6,089,081 | A | 7/2000 | Cook et al. | |
| 6,105,556 | A | 8/2000 | Takaku et al. | |
| 6,158,270 | A | 12/2000 | Garman et al. | |
| 6,164,123 | A | 12/2000 | Corkill | |
| 6,182,642 | B1 | 2/2001 | Ohkuma | |
| 6,260,410 | B1 | 7/2001 | Cook et al. | |
| 6,279,548 | B1 | 8/2001 | Reddy | |
| 6,283,098 | B1 | 9/2001 | Corkill | |
| 6,305,362 | B1 | 10/2001 | Kitamura et al. | |
| 6,314,797 | B1 | 11/2001 | Dawson et al. | |
| 6,321,727 | B1 | 11/2001 | Reddy et al. | |
| 6,508,235 | B2 | 1/2003 | Fabre | |
| 6,539,927 | B2 | 4/2003 | Fabre | |
| 6,626,032 | B2 | 9/2003 | Fabre et al. | |
| 6,658,923 | B2 | 12/2003 | Fabre | |
| 6,668,807 | B2 | 12/2003 | Weldon et al. | |
| 6,668,876 | B2 | 12/2003 | Veinotte et al. | |
| 6,722,189 | B2 | 4/2004 | Fabre | |
| 6,769,290 | B2 | 8/2004 | Fabre | |
| 6,772,739 | B2 | 8/2004 | Veinotte et al. | |
| 2001/0027680 | A1 | 10/2001 | Fabre | |
| 2001/0032625 | A1 | 10/2001 | Fabre | |
| 2001/0032626 | A1 | 10/2001 | Fabre | |
| 2003/0024510 | A1 | 2/2003 | Veinotte et al. | |
| 2003/0029425 | A1 | 2/2003 | Veinotte et al. | |
| 2003/0034015 | A1 | 2/2003 | Vienotte et al. | |
| 2003/0037772 | A1 | 2/2003 | Veinotte et al. | |
| 2003/0056771 | A1 | 3/2003 | Veinotte et al. | |
| 2003/0070473 | A1 | 4/2003 | Veinotte et al. | |
| 2004/0099254 | A1* | 5/2004 | Belanger et al. | 123/520 |

FOREIGN PATENT DOCUMENTS

| | | |
|---|---|---|
| EP | 0 611 674 | 8/1994 |
| EP | 0 952 332 | 10/1999 |
| FR | 2 732 072 | 9/1996 |
| JP | 07317612 | 12/1995 |
| JP | 11200961 | 7/1999 |
| JP | 11229975 | 8/1999 |
| WO | WO 99/18419 | 4/1999 |
| WO | WO 99/37905 | 7/1999 |

OTHER PUBLICATIONS

U.S. Appl. No. 10/804,197, filed Mar. 19, 2004, Veinotte, Evaporative Emissions Control and Diagnostics Module.

U.S. Appl. No. 10/794,087, filed Mar. 8, 2004, Perry et al., Poppet for an Integrated Pressure Management Apparatus and Fuel System and Method of Minimizing Resonance.

U.S. Appl. No. 10/794,083, filed Mar. 8, 2004, Veinotte, Flow-Through Diaphragm for a Fuel Vapor Pressure Management Apparatus.

U.S. Appl. No. 10/794,047, filed Mar. 8, 2004, Veinotte, Fuel System and Method for Managing Fuel Vapor Pressure with a Flow-Through Diaphragm.

U.S. Appl. No. 10/794,029, filed Mar. 8, 2004, Perry et al., Electrical Connections for an Integrated Pressure Management Apparatus.

U.S. Appl. No. 10/758,273, filed Jan. 16, 2004, Veinotte et al., Flow Sensor for Purge Valve Diagnostic.

U.S. Appl. No. 10/758,272, filed Jan. 16, 2004, Veinotte et al., Flow Sensor for Purge Valve Diagnostic.

U.S. Appl. No. 10/758,239, filed Jan. 16, 2004, Veinotte et al., Flow Sensor Integrated with Leak Detection for Purge Valve Diagnostic.

U.S. Appl. No. 10/758,238, filed Jan. 16, 2004, Veinotte, Flow Sensor Integrated with Leak Detection for Purge Valve Diagnostic.

U.S. Appl. No. 10/736,773, filed Dec. 17, 2003, Perry et al., Apparatus, System and Method of Establishing a Test Threshold for a Fuel Vapor Leak Detection System.

U.S. Appl. No. 10/667,965, filed Sep. 23, 2003, Veinotte, Method of Desigining a Fuel Vapor Pressure Management Apparatus.

U.S. Appl. No. 10/667,903, filed Sep. 23, 2003, Veinotte et al., Rationality Testing for a Fuel Vapor Pressure Management Apparatus.

U.S. Appl. No. 10/667,902, filed Sep. 23, 2003, Perry et al., In-Use Rate Based Calculation for a Vapor Pressure Management Apparatus.

* cited by examiner

METHOD FOR DETERMINING VAPOR CANISTER LOADING USING TEMPERATURE

CROSS REFERENCE TO CO-PENDING APPLICATIONS

This application claims the benefit of the earlier filing date of U.S. Provisional Application Ser. No. 6/456,418 filed Mar. 21, 2003, and U.S. Provisional Application Ser. No. 60/456,383, filed Mar. 21, 2003, the contents of which are incorporated by reference herein in their entirety.

FIELD OF THE INVENTION

This invention relates generally to on-board emission control systems for internal combustion engine powered motor vehicles, e.g., evaporative emission control systems, and more particularly to a vapor collection canister, such as a charcoal canister, in an evaporative emission control system.

BACKGROUND OF THE INVENTION

A known on-board evaporative emission control system includes a vapor collection canister that collects fuel vapor emitted from a tank containing a volatile liquid fuel for the engine. During engine operation, vacuum from the engine intake manifold induces atmospheric air flow through the canister to desorb the collected fuel vapor, and draws the fuel vapor into the engine intake manifold for comsumption in the combustion process. A canister purge solenoid valve is under the control of a purge control signal generated by a microprocessor-based engine management system, and periodically purges the collected vapor to the engine intake manifold.

As the vapor collection canister collects fuel vapor, the canister gradually becomes saturated with the fuel vapor. It is believed that there is a need for a method and apparatus for determining the degree of saturation of the canister.

SUMMARY OF THE INVENTION

In an embodiment, the invention provides a method of managing the saturation level of a vapor collection canister for an on-board fuel vapor emission control system. The method includes flowing the fuel vapor through a canister flow path between a first port and a second port of the vapor collection canister, and signaling with a sensor the temperature of an adsorbent disposed in the canister flow path, the sensor being exposed to the adsorbent.

The signaling with a sensor may include signaling the temperatures of a plurality of portions of the adsorbent with a plurality of sensors disposed in the respective plurality of portions of the adsorbent. The method may include locating an adsorption front of the adsorbent based on the temperature signals. The method may include purging an adsorbate from the adsorbent when the adsorption front advances to one of the plurality of portions of the adsorbent. The purging may include receiving the temperature signals with an electronic control unit, and sending an actuating control signal from the electronic control unit to a solenoid actuated valve disposed in a first conduit. The first conduit provides a purge flow path between the first port and an intake manifold of an internal combustion engine. The purging may include flowing atmospheric air through a second conduit that provides an atmospheric flow path to the second port, flowing the atmospheric air through the second port, flowing the atmospheric air through the canister flow path, and flowing the atmospheric air through the first conduit. The method may include managing the pressure of the canister purge valve with a pressure management valve disposed in the second conduit.

The receiving the temperature signals with the electronic control unit may include receiving the temperature signals with a printed circuit board that is disposed in the pressure management valve, and sending the temperature signals to the electronic control unit.

In another embodiment, the invention provides a method of managing fuel vapor in an on-board fuel vapor emission control system. The vapor emission control system includes a fuel tank headspace, a vapor collection canister, a canister purge valve, a pressure management valve, an electronic control unit, a first conduit providing fluid communication between the fuel tank headspace, the vapor collection canister, and an intake manifold of an internal combustion engine, and a second conduit providing fluid communication between the vapor collection canister and ambient atmosphere. The canister purge valve is disposed in the first conduit, and the pressure management valve is disposed in the second conduit. The method includes flowing the fuel vapor through a canister flow path between a first port and a second port of the vapor collection canister, and signaling with a sensor the temperature of an adsorbent disposed in the canister flow path, the sensor being exposed to the adsorbent.

The signaling with a sensor may include signaling the temperatures of a plurality of portions of the adsorbent with a plurality of sensors disposed in the respective plurality of portions of the adsorbent. The method may include locating an adsorption front of the adsorbent based on the temperature signals. The method may include purging an adsurbate from the adsurbent when the adsorption front advances to one of the plurality of portions of the adsorbent. The purging may include receiving the temperature signals with the electronic control unit, and sending an actuating control signal from the electronic control unit to the canister purge valve. The purging may include flowing atmospheric air through the second conduit, flowing the atmospheric air through the second port, flowing the atmospheric air through the canister flow path, and flowing the atmospheric air through the first conduit. The method may include managing the pressure of the canister purge valve with the pressure management valve.

The receiving the temperature signals with the electronic control unit may include receiving the temperature signals with a printed circuit board that is disposed in the pressure management valve, and sending the temperature signals to the electronic control unit.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

Figure 1:
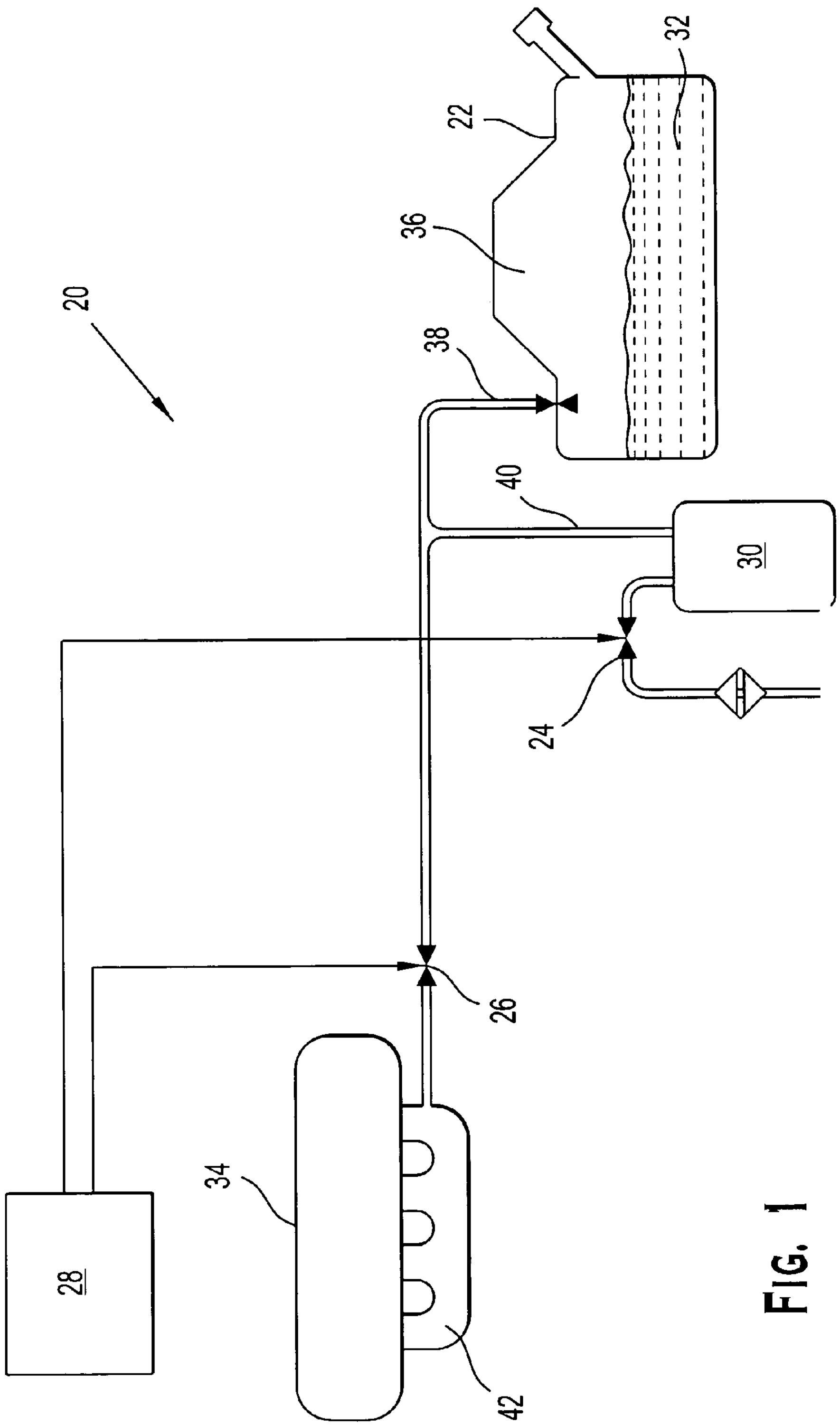
FIG. 1 is a schematic illustration of an on-board evaporative emission control system, according to an embodiment of the invention.

FIG. 1 schematically illustrates a preferred embodiment of an on-board evaporative emission control system 20. In the preferred embodiment, system 20 includes a vapor collection canister 30, a fuel tank 22, an integrated pressure management apparatus 24, a canister purge solenoid valve 26, and a microprocessor-based engine management system 28. Fuel tank 22 contains a volatile liquid fuel 32 for suppyling an internal combustion engine 34. Fuel vapor is emitted from the volatile liquid fuel 32 to a headspace 36 in the fuel tank 22. Conduits 38 and 40 provide a vapor connection between head space 36, vapor collection canister 30, and an intake manifold 42 of the internal combustion engine 34. Canister purge solenoid valve 26 is disposed in conduit 38 between intake manifold 42 and vapor collection canister 30. The integrated pressure management apparatus 24 is preferably integrally mounted on the vapor collection canister 30, and manages the internal pressure of the vapor collection canister 30 and the fuel tank 22. Reference is made to U.S. Pat. No. 6,668,876 for further description of an integrated pressure management apparatus.

As described in more detail below, vapor collection canister 30 collects fuel vapor emitted from the headspace 36. The amount of fuel vapor formed in headspace 36 is a function of vehicle dynamics, slosh, temperature, the type and grade of the volatile liquid fuel 32 in tank 22, and the pressure in tank 22. During operation of engine 34, vacuum from the engine intake manifold 42 acts on the canister purge solenoid valve 26. The canister purge solenoid valve 26 is under the control of a purge control signal generated by the microprocessor-based engine management system 28, and periodically purges the collected vapor to the engine intake manifold. With canister purge solenoid valve 26 in an open configuration, vacuum induces atmospheric air flow through the vapor collection canister 30 to desorb the collected fuel vapor from the canister 30, and draw the fuel vapor into the engine intake manifold 42 for comsumption in the combustion process.

Figure 2:
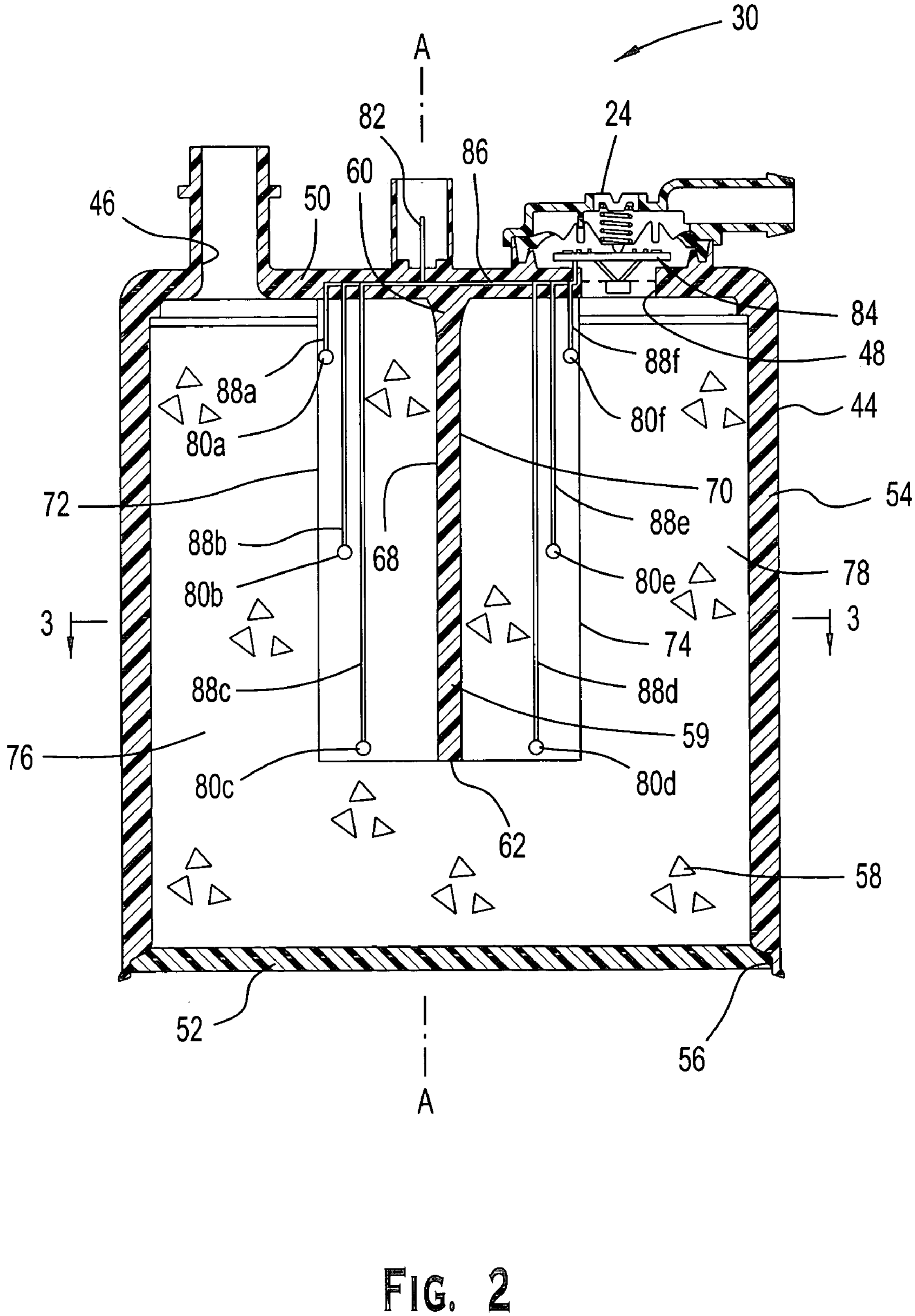
FIG. 2 is a cross-sectional view of a vapor collection canister, according to an embodiment of the invention.

FIG. 2 is a cross-sectional view of the vapor collection canister 30. Vapor collection canister 30 includes a housing 44 having a first port 46 and a second port 48. Housing 44 includes a first wall 50, a second wall 52, and a third wall 54 extending between first wall 50 and second wall 52. As shown in FIG. 2, third wall 54 is integrally formed with first wall 50, and second wall 52 forms a connection with third wall 54 at 56. However, first wall 50, second wall 52 and third wall 54 may be may be formed and joined in other ways, as long as housing 54 forms a chamber to contain an adsorbent 58. For example, second wall 52 may be formed integrally with third wall 54, and first wall 50 may form a connection with third wall 54. Adsorbent 58 may be charcoal or carbon, for example, and is described in more detail below.

Figure 3:
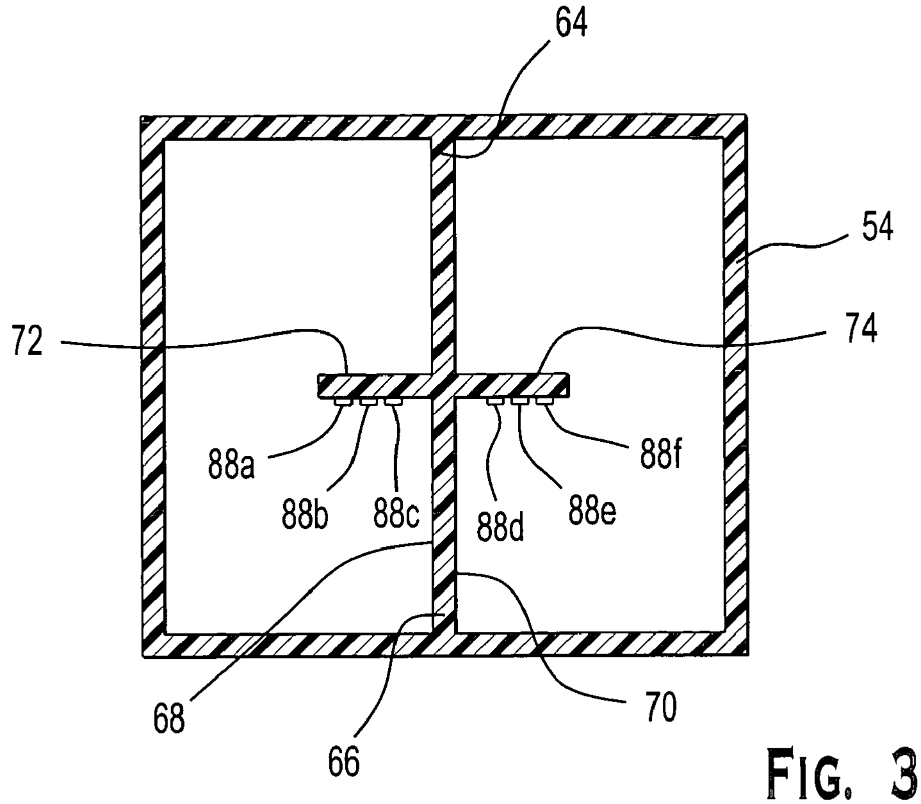
FIG. 3 is a cross-sectional view at axis 3—3 of the vapor collection canister of FIG. 2.

A partition wall 59 includes a proximate end 60 and a distal end 62, and a first edge 64, a second edge 66, a first face 68 and a second face 70 extending between proximate end 60 and distal end 62. Proximate end 60 may be mated with housing first wall 50, and may be formed integrally with housing first wall 50. Partition wall 6 extends along a longitudinal axis A—A such that distal end 62 is spaced from housing second wall 52. Referring to FIG. 3, first edge 64 and second edge 66 may be mated with housing third wall 54 and may be formed integrally with housing third wall 54. A first lead frame 72 extends substantially the length of partition wall 59, and projects outward from partition wall first face 68 toward housing third wall 54. A second lead frame 74 extends substantially the length of partition wall 59, and projects outward from partition wall second face 70 toward housing third wall 54.

The housing structure as described above forms a flow path between first port 46 and second port 48 such that a first portion 76 of the flow path is formed by first port 46, partition wall first face 68 and housing third wall 54, and a second portion 78 of the flow path is formed by second port 48, partition wall second face 70 and housing third wall 54. In this manner, flow through the vapor collection canister between first port 46 and second port 48 is forced around partition wall 59, rather than short circuiting in a direct path between first port 46 and second port 48.

The adsorbent 58 substantially fills the first portion 76 and the second portion 78 of the canister flow path. The adsorbent 58 adsorbs fuel vapor that passes through it by the process of adsorption. In one instance, adsorption is the partitioning of matter from a vapor phase onto the surface of a solid. The adsorbing solid is the adsorbent, and the matter concentrated or adsorbed on the surface of that solid is the adsorbate. Van der Waals forces and electrostatic forces between the adsorbate molecules and the atoms that comprise the adsorbent surface cause the adsorption. Energy is released in the form of heat as a result of the phase change of the vapor. This release of energy is known as the heat of adsorption. In the case of vapor collection canister 30, as fuel vapor flows through the first portion 76 and the second portion 78 of the canister flow path, the fuel vapor is adsorbed by adsorbent 58 and heat is generated. Depending upon the temperature and the partial pressure of the adsorbate, a condition is reached when a portion of the adsorbent 58 becomes substantially saturated, or loaded. When a portion of adsorbent 58 becomes loaded, a next portion of the adsorbate 58 adsorbs the fuel vapors, and heat is generated at this next portion of the adsorbate. In this manner, an adsorption front is formed that progresses downstream of the flow path, as upstream portions of the adsorbent 58 become loaded.

The heat of adsorption can be used to determine the canister loading by monitoring the adsorption front using means to determine the temperature of the adsorbent, such as one or more temperature sensors. Referring to FIG. 2, temperature sensors 80*a*–80*c* are secured to first lead frame 72 and are disposed in the adsorbent 58 within the first portion 76 of the canister flow path. Temperature sensors

80*d*–80*f* are secured to second lead frame 74 and are disposed in the adsorbent 58 within the second portion 78 of the canister flow path. Temperature sensors 80*a*–80*f* may be thermisters, for example. A connector terminal 82 is disposed at housing first wall 50 and provides an electrical connection to a printed circuit board 84 with a connector terminal lead 86. Connector terminal lead 86 includes a connector terminal power lead, a connector terminal ground lead, and a connector terminal signal lead. Individual sensor leads 88*a*–88*f* provide an electrical connection between printed circuit board 84 and respective temperature sensors 80*a*–80*f*. Each individual sensor lead 88*a*–88*f* includes a sensor power lead and a sensor signal lead. A common ground lead connects sensors 80*a*–80*f*. Printed circuit board 84 may be disposed in the integrated pressure management apparatus 24, and is in electrical communication with the electronic control unit 28 of the on-board evaporative emission control system 20. As shown in FIG. 2, temperature sensors 80*a*–80*f* are disposed in the adsorbent 58. However, temperature sensors 80*a*–80*f* may be disposed in other ways, as long as temperature sensors 80*a*–80*f* can detect the temperature of adsorbent 58. For example, temperature sensors 80*a*–80*f* may be formed in housing third wall 54, whether in contiguous contact with adsorbent 58, or not.

Figures 4A, 4B, 4C, 4D:
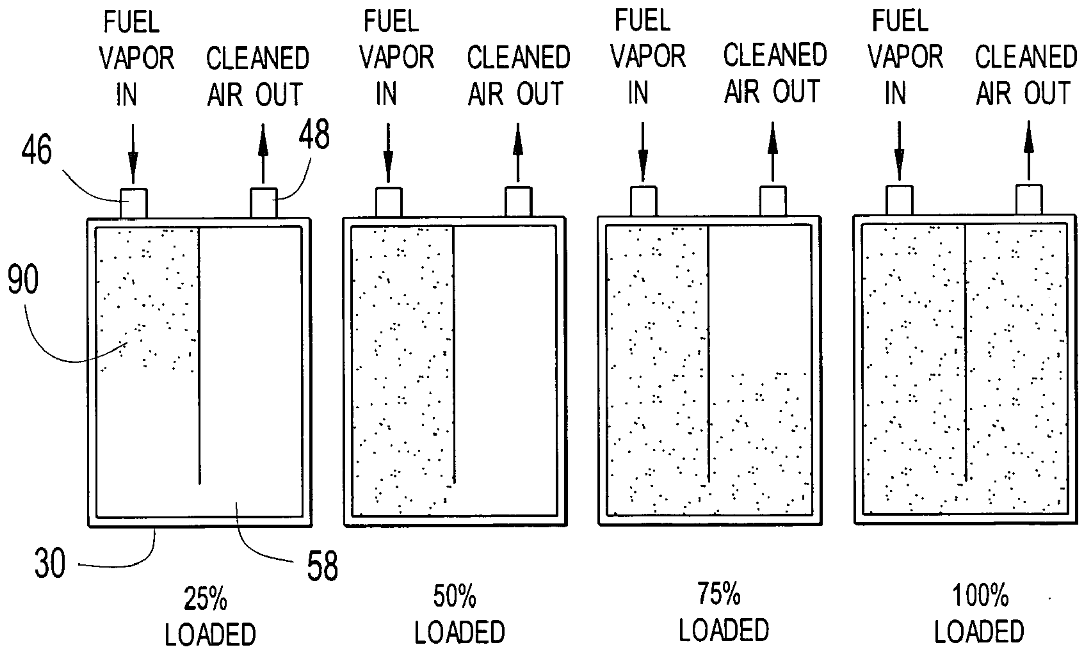
FIG. 4*a* is a schematic illustration of a vapor collection canister, in a condition of 25% fuel vapor saturation, according to an embodiment of the invention.
FIG. 4*b* is a schematic illustration of a vapor collection canister, in a condition of 50% fuel vapor saturation, according to an embodiment of the invention.
FIG. 4*c* is a schematic illustration of a vapor collection canister, in a condition of 75% fuel vapor saturation, according to an embodiment of the invention.
FIG. 4*d* is a schematic illustration of a vapor collection canister, in a condition of 100% fuel vapor saturation, according to an embodiment of the invention.

As fuel vapor from fuel tank headspace 36 enters vapor collection canister 30 through first port 46, adsorbent 58 proximate first port 46 adsorbs the fuel vapor. The temperature sensor 80*a* indicates an elevated temperature because the heat of adsorbtion will be emitted in the vicinity of temperature 80*a*. As the adsorbent 58 proximate first port 46 becomes saturated, or loaded, the adsorbent 58 proximate first port 46 will not adsorb more fuel vapor, and the adsorption front will progress downstream of the flow path. That is, the fuel vapor will then be adsorbed by adsorbent 58 proximate temperature sensor 80*b*. Temperature sensor 80*b* indicates an elevated temperature because the heat of adsorbtion will be emitted in the vicinity of temperature sensor 80*b*. Thus, it will be known by the instant invention, that the adsorbent proximate first inlet 46 is loaded, because the adsorption of the fuel vapor has progressed downstream of flow path first portion 76 proximate temperature sensor 80*b*. In this condition, the canister 30 is approximately 25% loaded. FIG. 4*a* is a schematic illustration of the vapor collection canister 30, showing a condition of 25% fuel vapor saturation, that is 25% of adsorbent 58 is loaded with adsorbate 9. As additional portions of adsorbent 58 become loaded, the adsorption front continues to progress downstream of the flow path past temperature sensors 80*c*–80*f*. FIG. 4*b* illustrates the vapor collection canister 30 in a 50% loaded condition. FIG. 4*c* illustrates the vapor collection canister 30 in a 75% loaded condition. When temperature sensor 80*f* indicates the presence of the adsorbtion front, the adsorbent 58 of the canister 30 is substantially loaded. FIG. 4*d* illustrates the vapor collection canister 30 in a 100% loaded condition. The printed circuit board 84 can signal the electronic control unit 28, and the electronic control unit 28 can signal the solenoid operated purge valve 26 to open, thus allowing vacuum generated by engine manifold 42 to draw atmospheric air into second port 48, through the canister flow path, out first port 46, and into the engine manifold 42. The flow of atmospheric air through the canister flow path desorbs the adsorbate from the adsorbent 58, and the adsorbate is consumed in the combustion process of the internal combustion engine 34. As a portion of the adsorbent 58 is purged of adsorbate, the temperature of the adsorbent 58 drops, thus defining a desorption front. The drop in temperature can be monitored by temperature sensors 80*a*–80*f*.

A portion of the adsorbent 58 proximate second port 48 is purged as atmospheric air is drawn through second port 48. Temperature sensor 88*f* signals a reduced temperature to the printed circuit board 84. The desorption front progresses past temperature sensors 80*e*–80*a*. The adsorbent 58 of the canister 30 is substantially purged when temperature sensor 80*a* signals a drop in temperature, indicating that the desorption front is proximate first port 46. When the canister 30 is substantially purged, the printed circuit board 84 can signal the electronic control unit 28 to actuate the solenoid actuated purge valve 26 to a closed configuration.

Figure 5:
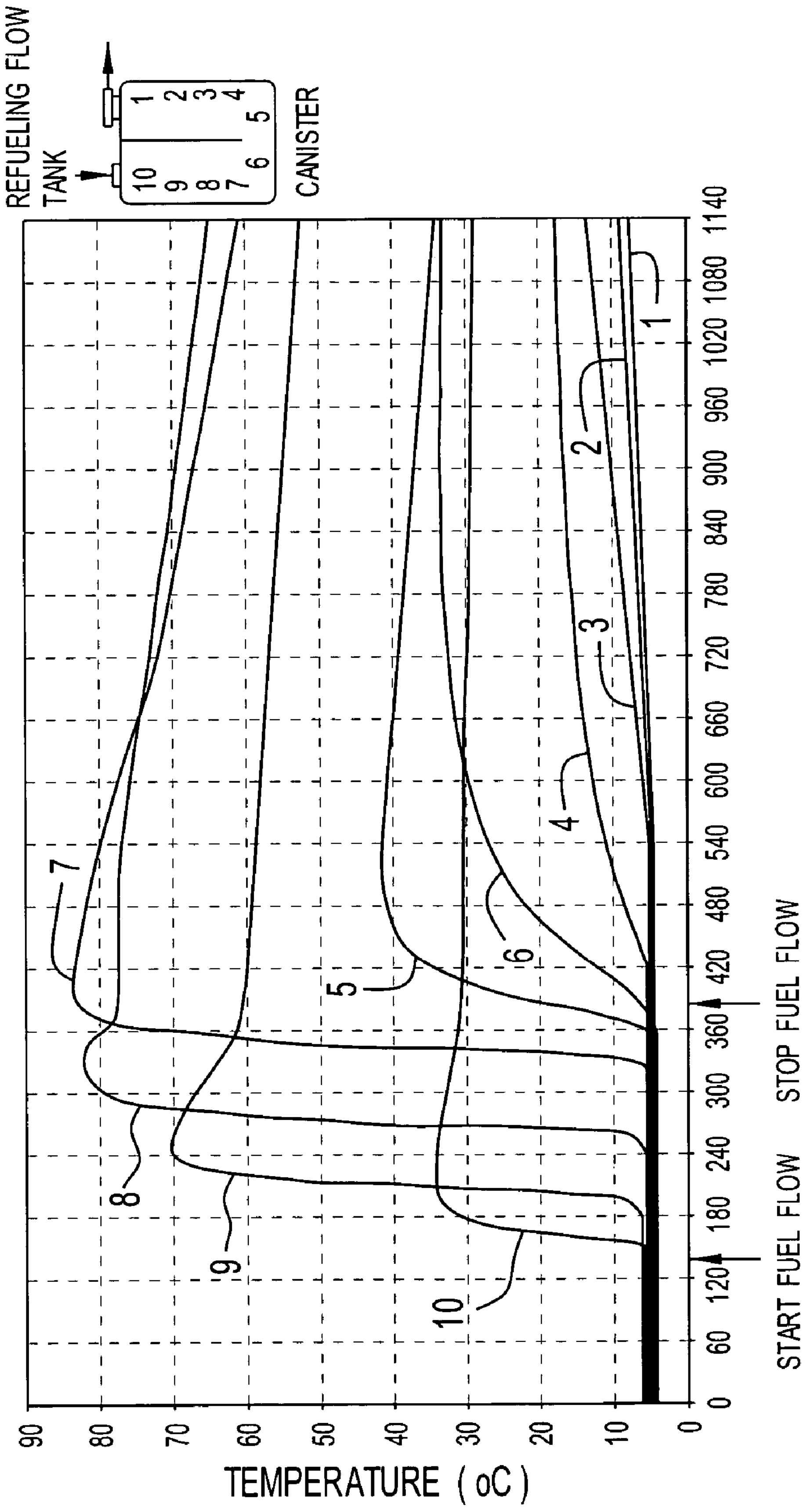
FIG. 5 is a graphical representation of testing data for a vapor collection canister, according to an embodiment of the invention.
Figure 6:
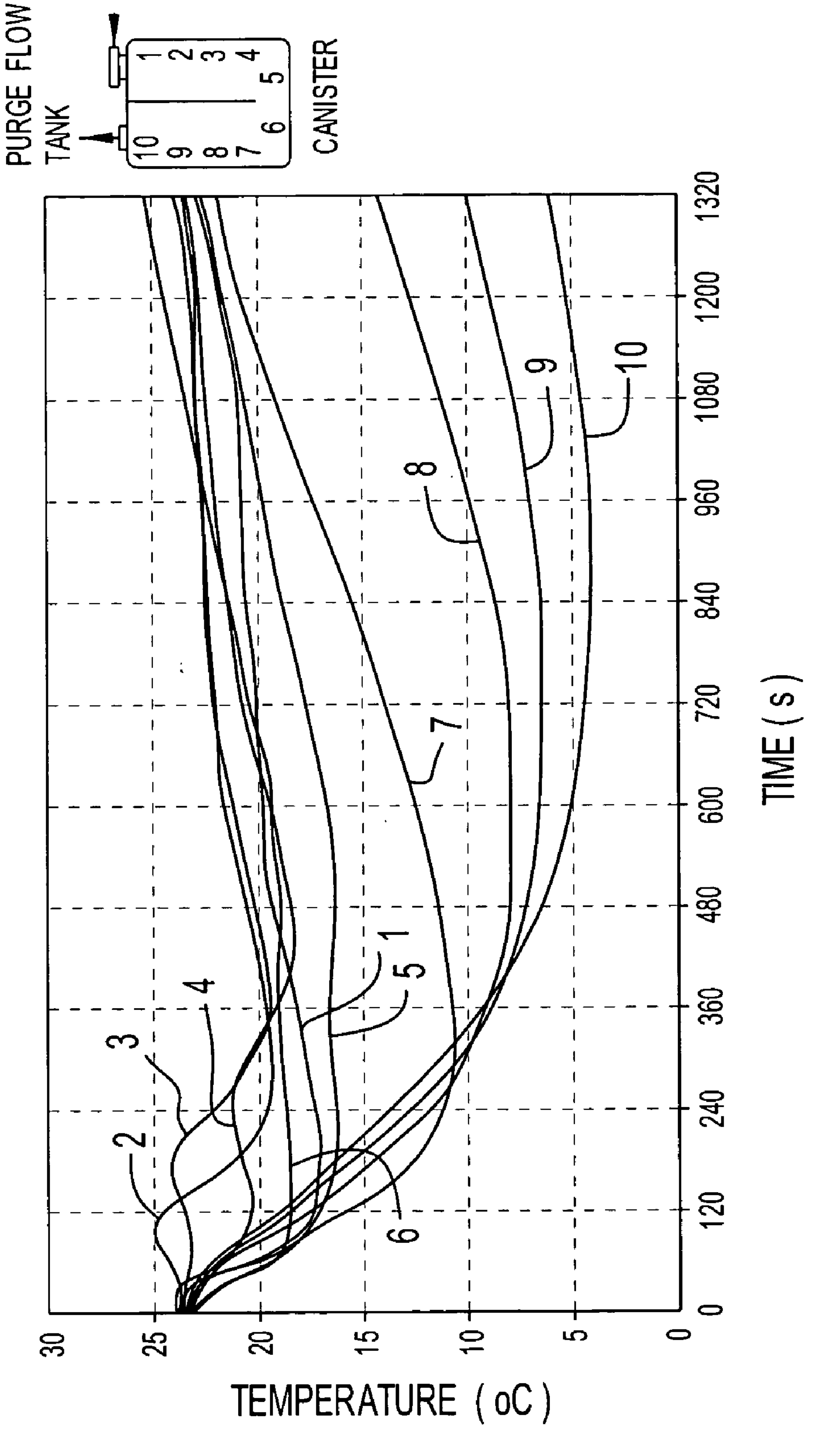
FIG. 6 is another graphical representation of testing data for a vapor collection canister, according to an embodiment of the invention.

Testing was performed on a preferred embodiment of a vapor collection canister using ten temperature sensors disposed throughout the canister flow path. FIG. 5 illustrates test data captured during a vehicle-refueling event where fuel vapor is being adsorbed by a charcoal canister. As the adsorption front passes each of the temperature sensors embedded in the canister, an increase in temperature is recorded. FIG. 6 illustrates test data captured during a charcoal canister purge event where fuel vapor is being released by the charcoal canister. As the desorbtion front passes each of the temperature sensors embedded in the canister, a decrease in temperature is recorded. The temperature begins to warm up to the ambient temperature after the desorbtion front has passed.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A method of managing the saturation level of a vapor collection canister for an on-board fuel vapor emission control system, comprising:

providing a vapor collection canister having a first port and a second port, the vapor collection canister defining a volume with a partition within the vapor collection canister dividing the volume into at least first and second portions, the first port being in communication with the first portion and the second port being in communication with the second portion, flowing the fuel vapor through a canister flow path between the first port and the second port, providing at least one temperature sensor in each of the first and second portions, and signaling with the sensors the temperature of an adsorbent disposed in the canister flow path, the sensors being exposed to the adsorbent.

2. The method of claim 1, wherein the signaling with the sensors comprises signaling the temperatures of each of the first and second portions with a plurality of sensors disposed in respective plurality of portions of the adsorbent.

3. The method of claim 2, further comprising locating an adsorption front of the adsorbent based on the temperature signals.

4. The method of claim 3, further comprising purging an adsorbate from the adsorbent when the adsorption front advances to one of the plurality of portions of the adsorbent.

5. The method of claim 4, wherein the purging comprises:

receiving the temperature signals with an electronic control unit; and sending an actuating control signal from the electronic control unit to a solenoid actuated valve disposed in a first conduit, the first conduit providing a purge flow path between the first port and an intake manifold of an internal combustion engine.

6. The method of claim 5, wherein the purging comprises:

flowing atmospheric air through a second conduit, the second conduit providing an atmospheric flow path to the second port;

flowing the atmospheric air through the second port;

flowing the atmospheric air through the canister flow path; and flowing the atmospheric air through the first conduit.

7. The method of claim 6, further comprising managing the pressure of the canister purge valve with a pressure management valve disposed in the second conduit.

8. The method of claim 7, wherein the receiving the temperature signals with the electronic control unit comprises:

receiving the temperature signals with a printed circuit board, the printed circuit board being disposed in the pressure management valve; and sending the temperature signals to the electronic control unit.

9. A method of managing fuel vapor in an on-board fuel vapor emission control system, the vapor emission control system including a fuel tank headspace, a vapor collection canister, a canister purge valve, a pressure management valve, an electronic control unit, a first conduit providing fluid communication between the fuel tank headspace, the vapor collection canister, and an intake manifold of an internal combustion engine, and a second conduit providing fluid communication between the vapor collection canister and ambient atmosphere, the canister purge valve being disposed in the first conduit, the pressure management valve being disposed in the second conduit, the vapor collection canister having a first port and a second port, the vapor collection canister defining a volume with a partition within the vapor collection canister dividing the volume into at least first and second portions, the first port being in communication with the first portion and the second port being in communication with the second portion, the method comprising:

flowing the fuel vapor through a canister flow path between the first port and the a second port;

providing at least one temperature sensor in each of the first and second portions, and signaling with the sensors the temperature of an adsorbent disposed in the canister flow path, the sensors being exposed to the adsorbent.

10. The method of claim 9, wherein the signaling with the sensors comprises signaling the temperatures of each of the first and second portions with a plurality of sensors disposed in respective plurality of portions of the adsorbent.

11. The method of claim 10, further comprising locating an adsorption front of the adsorbent based on the temperature signals.

12. The method of claim 11, further comprising purging an adsorbate from the adsorbent when the adsorption front advances to one of the plurality of portions of the adsorbent.

13. The method of claim 12, wherein the purging comprises:

receiving the temperature signals with the electronic control unit; and sending an actuating control signal from the electronic control unit to the canister purge valve.

14. The method of claim 13, wherein the purging comprises:

flowing atmospheric air through the second conduit;

flowing the atmospheric air through the second port;

flowing the atmospheric air through the canister flow path; and flowing the atmospheric air through the first conduit.

15. The method of claim 14, further comprising managing the pressure of the canister purge valve with the pressure management valve.

16. The method of claim 15, wherein the receiving the temperature signals with the electronic control unit comprises:

receiving the temperature signals with a printed circuit board, the printed circuit board being disposed in the pressure management valve; and sending the temperature signals to the electronic control unit.

* * * * *